United States Patent
Katayama et al.

(10) Patent No.: US 9,156,726 B2
(45) Date of Patent: Oct. 13, 2015

(54) TOUGHENED GLASS SUBSTRATE AND PROCESS FOR PRODUCING SAME

(75) Inventors: Hiroki Katayama, Shiga (JP); Masashi Tabe, Shiga (JP); Takuji Oka, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/241,125

(22) PCT Filed: Aug. 29, 2012

(86) PCT No.: PCT/JP2012/071884
§ 371 (c)(1),
(2), (4) Date: Feb. 26, 2014

(87) PCT Pub. No.: WO2013/031855
PCT Pub. Date: Mar. 7, 2013

(65) Prior Publication Data
US 2014/0212649 A1    Jul. 31, 2014

(30) Foreign Application Priority Data
Aug. 31, 2011 (JP) ................. 2011-188401

(51) Int. Cl.
C03C 15/00 (2006.01)
C03C 19/00 (2006.01)
C03B 18/02 (2006.01)
C03C 4/18 (2006.01)
C03C 3/085 (2006.01)
C03C 3/087 (2006.01)
C03C 21/00 (2006.01)

(52) U.S. Cl.
CPC . *C03C 4/18* (2013.01); *C03C 3/085* (2013.01); *C03C 3/087* (2013.01); *C03C 21/002* (2013.01); *Y10T 428/315* (2015.01)

(58) Field of Classification Search
CPC ............................ C03C 21/002; C03C 21/003
See application file for complete search history.

(56) References Cited

U.S. PATENT DOCUMENTS

| 4,671,814 | A * | 6/1987 | Aratani et al. ............... 65/30.14 |
| 4,859,636 | A * | 8/1989 | Aratani et al. .................. 501/72 |
| 5,085,910 | A * | 2/1992 | Matsushima et al. ........ 428/64.4 |
| 2003/0205558 | A1 * | 11/2003 | Kuzuwa et al. ................. 216/97 |
| 2005/0003136 | A1 | 1/2005 | Kurachi et al. |
| 2005/0062416 | A1 * | 3/2005 | Adachi et al. ................. 313/582 |
| 2005/0073475 | A1 * | 4/2005 | Adachi et al. ................... 345/60 |
| 2005/0160768 | A1 * | 7/2005 | Adachi et al. ................. 65/99.2 |
| 2006/0063009 | A1 | 3/2006 | Naitou et al. |
| 2009/0079671 | A1 | 3/2009 | Nishi et al. |
| 2009/0113935 | A1 * | 5/2009 | Suzuki et al. ..................... 65/64 |
| 2009/0325776 | A1 | 12/2009 | Murata |
| 2011/0091704 | A1 | 4/2011 | Akiba et al. |
| 2012/0088067 | A1 * | 4/2012 | Rappoport et al. ........... 428/141 |
| 2012/0196110 | A1 * | 8/2012 | Murata et al. ................. 428/220 |
| 2012/0327613 | A1 * | 12/2012 | Park et al. ..................... 361/748 |
| 2013/0017380 | A1 * | 1/2013 | Murata et al. ................. 428/215 |
| 2013/0059717 | A1 * | 3/2013 | Veerasamy et al. ............. 501/53 |
| 2013/0201613 | A1 | 8/2013 | Akiba et al. |
| 2014/0120335 | A1 * | 5/2014 | Yamanaka et al. ............ 428/220 |

FOREIGN PATENT DOCUMENTS

| JP | 61-205639 | 9/1986 |
| JP | 61-209930 | 9/1986 |
| JP | 63-60128 | 3/1988 |
| JP | 2005-15328 | 1/2005 |
| JP | 2006-83045 | 3/2006 |
| JP | 2010-30876 | 2/2010 |
| JP | 2011-88763 | 5/2011 |
| WO | 2007/004634 | 1/2007 |

OTHER PUBLICATIONS

International Preliminary Report on Patentability and Written Opinion of the International Searching Authority issued Mar. 13, 2014 in International (PCT) Application No. PCT/JP2012/071884.
International Search Report issued Oct. 2, 2012 in International (PCT) Application No. PCT/JP2012/071884.
Tetsuro Izumitani et al., "New Glass and Physical Properties Thereof," First Edition, Management System Laboratory. Co., Ltd., Aug. 20, 1984, pp. 451-498 with partial English translation.

* cited by examiner

*Primary Examiner* — Jason L Lazorcik
(74) *Attorney, Agent, or Firm* — Wenderoth, Lind & Ponack, L.L.P.

(57) ABSTRACT

Provided is a tempered glass substrate formed by a float method, comprising a bottom surface and a top surface, wherein a compression stress value of the bottom surface is larger than a compression stress value of the top surface.

7 Claims, No Drawings

TOUGHENED GLASS SUBSTRATE AND PROCESS FOR PRODUCING SAME

TECHNICAL FIELD

The present invention relates to a tempered glass substrate and a production method for the same, and more particularly, to a tempered glass substrate suitable for a cover glass for a cellular phone, a digital camera, a personal digital assistant (PDA), or a solar cell, or a substrate for a display, in particular, a touch panel display, and a production method for the same.

BACKGROUND ART

Devices such as a cellular phone, a digital camera, a PDA, a touch panel display, a large-screen television, and a wireless charging system tend to be more widely used.

In any of those applications, a resin substrate such as an acrylic substrate has been conventionally used as a protective member for protecting a display. However, the resin substrate has a low Young's modulus, and hence, when the view surface of the display was pushed with a pen, a human finger, or the like, the resin substrate easily bended and touched with the internal display, sometimes causing a display defect. Further, the resin substrate has also involved a problem in that the resin substrate is liable to have flaws on its surfaces, resulting in easy reduction of its visibility. One of the ways to solve those problems is to use a glass substrate as a protective member. The glass substrate (cover glass) used as a protective member is required to, for example, (1) have a high mechanical strength, (2) have a low density and a light weight, (3) be able to be supplied at low cost in large quantity, (4) is excellent in bubble quality, (5) have a highlight transmittance in the visible region, and (6) have a high Young's modulus so as not to bend easily when its surface is pushed with a pen, a finger, or the like. In particular, when a glass substrate does not satisfy the requirement (1), the glass substrate does not satisfactorily serve as a protective member, and hence a glass substrate tempered by, for example, ion exchange (which is the so-called tempered glass substrate) has been conventionally used as a protective member (see Patent Literatures 1 and 2, and Non Patent Literature 1).

CITATION LIST

Patent Literature

Patent Literature 1: JP 2006-83045 A
Patent Literature 2: JP 2011-88763 A

Non Patent Literature

Non Patent Literature 1: Tetsuro Izumitani et al., "New glass and physical properties thereof," First edition, Management System Laboratory. Co., Ltd., Aug. 20, 1984, p. 451-498

SUMMARY OF INVENTION

Technical Problem

By the way, a float method is a forming method by which large and thin glass substrates can be produced at low cost in large quantity. When a glass substrate to be tempered is formed by the float method, the production cost of the resultant tempered glass substrate can be reduced. For example, Patent Literature 2 discloses a tempered glass substrate which is formed by the float method, comprises, as a glass composition in terms of mol %, 67 to 75% of $SiO_2$, 0 to 4% of $Al_2O_3$, 7 to 15% of $Na_2O$, 1 to 9% of $K_2O$, 6 to 14% of MgO, 0 to 1% of CaO, 0 to 1.5% of $ZrO_2$, 71 to 75% of $SiO_2+Al_2O_3$, and 12 to 20% of $Na_2O+K_2O$, and has a thickness of 1.5 mm or less.

However, when a glass substrate to be tempered formed by the float method is subjected to ion exchange treatment, because the substrate surface located on the side contacting a tin bath (hereinafter referred to as "bottom surface") in the production process of the glass substrate and the surface located opposite to the above one (hereinafter referred to as "top surface") have different thermal histories in the production process of the glass substrate, there occurs a problem in that the resultant tempered glass substrate warps so that its top surface side has a convex shape. When the warpage level of the tempered glass substrate is large, the yield of the tempered glass substrate tends to reduce. In particular, as a larger and/or thinner tempered glass substrate is produced, the tendency is more remarkable. Further, when a large and/or thin glass substrate to be tempered is subjected to ion exchange treatment, thereby yielding a tempered glass substrate having a predetermined size, the influence of the problem becomes more significant.

Thus, a technical object of the present invention is to invent a tempered glass substrate which has a small warpage level even though it is formed by the float method and a production method for the tempered glass substrate.

Solution to Problem

The inventors of the present invention have made various studies. As a result, the inventors have found that the above-mentioned technical object can be achieved by forming a tempered glass substrate by the float method so that the compression stress value of the bottom surface thereof is larger than the compression stress value of the top surface thereof, and the finding is proposed as the present invention. That is, a tempered glass substrate of the present invention is a tempered glass substrate formed by a float method, comprising a bottom surface and a top surface, wherein a compression stress value of the bottom surface is larger than a compression stress value of the top surface. Herein, the "compression stress value" refers to a value which is calculated from the number of interference fringes on a sample and each interval between the interference fringes, the interference fringes being observed when a surface stress meter (such as FSM-6000 manufactured by Toshiba Corporation) is used to observe the sample.

As mentioned above, when a glass substrate to be tempered is formed by the float method, its top surface and bottom surface have different thermal histories in the production process of the glass substrate. By virtue of an influence of the difference, $Na_2O$-rich layers are formed in the top surface. When the $Na_2O$-rich layers are formed in the top surface, the ion exchange performance of the top surface is promoted. As a result, the compression stress value of the top surface becomes larger than the compression stress value of the bottom surface. Further, in the bottom surface of the glass substrate to be tempered, Sn diffuses from the tin bath, forming Sn-diffused layers. The parts in which the Sn-diffused layers are formed are compositionally non-uniform. When such a glass substrate to be tempered as having this state is subjected to ion exchange treatment, there occurs a phenomenon in which the resultant tempered glass substrate warps so that its top surface side has a convex shape.

Then, the inventors of the present invention have found that, when the compression stress value of the bottom surface of a tempered glass substrate is controlled to a compression stress value larger than that of the top surface thereof, the warpage level of the tempered glass substrate can be reduced, though the detailed mechanism of the reduction is under study. A method of controlling the compression stress value of the bottom surface to a compression stress value larger than that of the top surface is, for example, a method involving removing $Na_2O$-rich layers in the top surface of a glass substrate to be tempered to a certain extent, thereby reducing the ion exchange performance of the top surface, and then applying ion exchange treatment thereto. Also conceived is a method involving subjecting the top surface of a tempered glass substrate to annealing treatment while keeping the top surface in contact with a setter, and then applying ion exchange treatment thereto.

Second, it is preferred that the tempered glass substrate of the present invention have a ΔCS value (the compression stress value of the bottom surface−the compression stress value of the top surface) of 5 to 39 MPa. With this, the warpage level of the tempered glass substrate can be reduced more certainly.

Third, it is preferred that the tempered glass substrate of the present invention have a warpage rate of less than 0.20%. Herein, the "warpage rate" refers to an absolute value and can be calculated on the basis of, for example, the expression "maximum displacement/glass width." The "maximum displacement" can be measured with, for example, a laser displacement meter.

Fourth, it is preferred that the tempered glass substrate of the present invention comprise, as a glass composition in terms of mass %, 40 to 71% of $SiO_2$, 7 to 21% of $Al_2O_3$, 0 to 1% of $Li_2O$, 7 to 20% of $Na_2O$, and 0 to 15% of $K_2O$.

Fifth, it is preferred that the tempered glass substrate of the present invention be formed by tempering by ion exchange.

Sixth, it is preferred that the tempered glass substrate of the present invention have a stress thickness of 10 μm or more. Herein, the "stress thickness" refers to a value which is calculated from the number of interference fringes on a sample and each interval between the interference fringes, the interference fringes being observed when a surface stress meter (such as FSM-6000 manufactured by Toshiba Corporation) is used to observe the sample.

Seventh, it is preferred that the tempered glass substrate of the present invention have an internal tensile stress of 200 MPa or less. Herein, the "internal tensile stress" is calculated from the following equation.

Internal tensile stress=(compression stress value×stress thickness)/(substrate thickness−stress thickness×2)

Eighth, it is preferred that the tempered glass substrate of the present invention have a thickness of 1.0 mm or less.

Ninth, it is preferred that the tempered glass substrate of the present invention have a liquidus viscosity of $10^{4.0}$ dPa·s or more. Herein, the "liquidus viscosity" refers to a value obtained through measurement of a viscosity of glass at the liquidus temperature by a platinum sphere pull up method. The "liquidus temperature" refers to a temperature at which crystals of glass are deposited after glass powder that passes through a standard 30-mesh sieve (sieve opening: 500 μm) and remains on a 50-mesh sieve (sieve opening: 300 μm) is placed in a platinum boat and then kept for 24 hours in a gradient heating furnace.

Tenth, it is preferred that the tempered glass substrate of the present invention be used for a cover glass for a display.

Eleventh, a glass substrate to be tempered of the present invention is a glass substrate to be tempered formed by a float method, comprising a bottom surface and a top surface, wherein a compression stress value of the bottom surface is larger than a compression stress value of the top surface when the glass substrate to be tempered is immersed in a $KNO_3$ molten salt at 440° C. for 6 hours.

Twelfth, a glass substrate to be tempered of the present invention is a glass substrate to be tempered formed by a float method, wherein the glass substrate to be tempered has a warpage rate of less than 0.20% when the glass substrate to be tempered is immersed in a $KNO_3$ molten salt at 440° C. for 6 hours.

Thirteenth, a production method for a tempered glass substrate of the present invention comprises: (1) a forming step of forming glass into a glass sheet by a float method to yield a glass substrate to be tempered; (2) a polishing step of polishing a top surface of the glass substrate to be tempered and/or a bottom surface thereof; and (3) a tempering step of applying ion exchange treatment to the glass substrate to be tempered so that the bottom surface has a larger compression stress value than that of the top surface.

Fourteenth, in the production method for a tempered glass substrate of the present invention, it is preferred that the polishing step be a step of polishing only the top surface or a step of polishing the top surface and the bottom surface so that a polishing thickness of the top surface is larger than a polishing thickness of the bottom surface.

DESCRIPTION OF EMBODIMENTS (1) Tempered Glass Substrate

A tempered glass substrate according to an embodiment of the present invention has a compression stress layer in a surface thereof. Although a physical tempering method may be used as a method of forming the compression stress layer in the surface, a chemical tempering method is more preferably used. The chemical tempering method is a method involving introducing alkali ions each having a large ion radius into the surface layer of glass by ion exchange treatment at a temperature equal to or lower than a strain point of the glass. When the chemical tempering method is used to form a compression stress layer, the compression stress layer can be properly formed even in the case where the substrate thickness is small. In addition, even when a tempered glass substrate is cut after the formation of the compression stress layer, the tempered glass substrate does not easily break unlike a tempered glass produced by applying a physical tempering method such as an air cooling tempering method.

The tempered glass substrate of this embodiment has a ΔCS value (the compression stress value of the bottom surface−the compression stress value of the top surface) of preferably 5 to 39 MPa, 8 to 30 MPa, particularly preferably 10 to 25 MPa. When a tempered glass substrate has too small a ΔCS value, the tempered glass substrate is liable to warp so that the top surface side has a convex shape, and hence the warpage level of the tempered glass substrate is liable to be larger. On the other hand, when a tempered glass substrate has too large a ΔCS value, the tempered glass substrate is liable to warp so that the bottom surface side has a convex shape, and hence the warpage level of the tempered glass substrate is liable to be larger.

The tempered glass substrate of this embodiment has a warpage rate of preferably less than 0.20%, less than 0.15%, less than 0.1%, less than 0.05%, particularly preferably less than 0.03%. When a tempered glass substrate has a larger warpage rate, the yield of the tempered glass substrate tends to reduce, and particularly when the tempered glass substrate is a large and/or thin tempered glass substrate, the tendency is more remarkable.

The tempered glass substrate of this embodiment preferably comprises, as a glass composition in terms of mass %, 40 to 71% of $SiO_2$, 7 to 21% of $Al_2O_3$, 0 to 1% of $Li_2O$, 7 to 20% of $Na_2O$, and 0 to 15% of $K_2O$. The reason why the content range of each component is limited as described above is described below. Note that, unless specifically indicated, the expression "%" refers to "mass %" in the following description of the content range of each component.

$SiO_2$ is a component forming a network of a glass. The content of $SiO_2$ is preferably 40 to 71%, 40 to 70%, 40 to 63%, 45 to 63%, 50 to 59%, particularly preferably 55 to 58.5%. When the content of $SiO_2$ is too large, melting and molding of the glass become difficult, its thermal expansion coefficient becomes too low, and matching of the thermal expansion coefficient with those of peripheral materials becomes difficult. On the other hand, when the content of $SiO_2$ is too small, glass formation becomes difficult. Further, the thermal expansion coefficient becomes large, and thermal shock resistance tends to lower.

$Al_2O_3$ is a component enhancing ion exchange performance, and has also an effect of enhancing a strain point and a Young's modulus. The content of $Al_2O_3$ is 7 to 21%. When the content of $Al_2O_3$ is too large, a devitrified crystal tends to deposit in the glass and molding by a float method becomes difficult. Further, the thermal expansion coefficient becomes too low, and matching of the thermal expansion coefficient with those of peripheral materials becomes difficult, and its viscosity at high temperature rises, and it becomes difficult to melt the glass. When the content of $Al_2O_3$ is too small, there occurs a possibility of no manifestation of sufficient ion exchange performance. From the above-mentioned viewpoints, the upper limit range of $Al_2O_2$ is suitably 20% or less, 19% or less, 18% or less, 17% or less, particularly suitably 16.5% or less, and the lower limit range of $Al_2O_3$ is suitably 7.5% or more, 8.5% or more, 9% or more, 10% or more, 11% or more, particularly suitably 12% or more.

$Li_2O$ is an ion exchange component, and is also a component lowering the viscosity at high temperature to enhance fusibility and moldability. Further, $Li_2O$ is a component improving the Young's modulus. Further, $Li_2O$ has a high effect of enhancing the compression stress value among alkali metal oxides. However, when the content of $Li_2O$ is too large, the liquid phase viscosity lowers and the glass tends to be devitrified. Further, the thermal expansion coefficient becomes too high, and hence, the thermal shock resistance lowers, and matching of the thermal expansion coefficient with those of peripheral materials becomes difficult. Further, when the viscosity at low temperature is lowered too much to cause a possibility that stress relaxation occurs easily, the compression stress values decrease adversely in some cases. Therefore, the content of $Li_2O$ is preferably 0 to 1%, 0 to 0.5%, or 0 to 0.1%, and substantially no content, namely, suppression to less than 0.01% is desirable.

$Na_2O$ is an ion exchange component, and is also a component lowering the viscosity at high temperature to enhance the fusibility and the moldability. Further, $Na_2O$ is also a component improving devitrification resistance. The content of $Na_2O$ is preferably 7 to 20%, 10 to 20%, 10 to 19%, 12 to 19%, 12 to 17%, 13 to 17%, particularly preferably 14 to 17%. When the content of $Na_2O$ is too large, the thermal expansion coefficient becomes too high, and hence, the thermal shock resistance lowers, and matching of the thermal expansion coefficient with those of peripheral materials becomes difficult. Further, there are tendencies that the strain point lowers too much, and a balance of the glass composition is lacking, thereby deteriorating the devitrification resistance. On the other hand, when the content of $Na_2O$ is small, the fusibility deteriorates, the thermal expansion coefficient becomes too low, and the ion exchange performance is liable to deteriorate.

$K_2O$ is a component that has an effect of promoting ion exchange, and shows a high effect of enlarging a stress depth, among alkali metal oxides. Further, $K_2O$ is a component lowering the viscosity at high temperature to enhance the fusibility and the moldability. $K_2O$ is also a component improving the devitrification resistance. The content of $K_2O$ is preferably 0 to 15%. When the content of $K_2O$ is too large, the thermal expansion coefficient becomes high, the thermal shock resistance lowers, and matching of the thermal expansion coefficient with those of peripheral materials becomes difficult. Further, there are tendencies that the strain point lowers too much, and the balance of the glass composition is lacking, thereby deteriorating the devitrification resistance. Therefore, the upper limit range of $K_2O$ is suitably 12% or less, 10% or less, 8% or less, particularly suitably 6% or less.

When the total content of alkali metal oxides $R_2O$ (R represents one kind or more selected from Li, Na, and K) is too large, the glass tends to be devitrified, and in addition, the thermal expansion coefficient becomes too high, and hence, the thermal shock resistance lowers, and matching of the thermal expansion coefficient with those of peripheral materials becomes difficult. Further, when the total content of the alkali metal oxides $R_2O$ is too large, the strain point lowers too much, and a high compression stress value is not obtained in some cases. Further, the viscosity around the liquid phase temperature lowers, and it becomes difficult to obtain a high liquid phase viscosity in some cases. Therefore, the total content of $R_2O$ is preferably 22% or less, 20% or less, particularly preferably 19% or less. On the other hand, when the total content of $R_2O$ is too small, the ion exchange performance and the fusibility deteriorate in some cases. Therefore, the total content of $R_2O$ is preferably 8% or more, 10% or more, 13% or more, particularly preferably 15% or more.

In addition to the components described above, the following components may be added.

For example, alkaline earth metal oxides R'O (R' represents one kind or more selected from Mg, Ca, Sr, and Ba) are components which can be added for various purposes. However, when the total content of the alkaline earth metal oxides R'O becomes large, the density and the thermal expansion coefficient become high, and the denitrification resistance deteriorates, and in addition, the ion exchange performance tends to deteriorate. Therefore, the total content of the alkaline earth metal oxides R'O is preferably 0 to 9.9%, 0 to 8%, 0 to 6%, particularly preferably 0 to 5%.

MgO is a component which lowers the viscosity at high temperature to enhance the fusibility and the moldability, or to enhance the strain point and the Young's modulus, and shows a high effect of improving the ion exchange performance, among alkaline earth metal oxides. However, when the content of MgO becomes large, the density and the thermal expansion coefficient increase, and the glass is liable to be devitrified. The content of MgO is preferably 0 to 9%, particularly preferably 1 to 8%.

CaO is a component which lowers the viscosity at high temperature to enhance the fusibility and the moldability, or to enhance the strain point and the Young's modulus, and shows a high effect of improving the ion exchange performance among alkaline earth metal oxides. The content of CaO is preferably 0 to 6%. However, when the content of CaO becomes large, the density and the thermal expansion coefficient increase, and the glass is liable to be devitrified, and in addition, the ion exchange performance deteriorates in some cases. Therefore, the content of CaO is preferably 0 to 4%, 0 to 3%, 0 to 2%, 0 to 1%, particularly preferably 0 to 0.1%.

SrO and BaO are components which lower the viscosity at high temperature to enhance the fusibility and the moldability, or to enhance the strain point and the Young's modulus. The content of each of SrO and BaO is preferably 0 to 3%. When the content of SrO or BaO becomes large, the ion exchange performance tends to deteriorate. Further, the density and the thermal expansion coefficient increase, and the glass is liable to be devitrified. The content of SrO is preferably 2% or less, 1.5% or less, 1% or less, 0.5% or less, 0.2% or less, particularly preferably 0.1% or less. In addition, the content of BaO is preferably 2.5% or less, 2% or less, 1% or less, 0.8% or less, 0.5% or less, 0.2% or less, particularly preferably 0.1% or less.

$ZrO_2$ has effects of remarkably improving the ion exchange performance and simultaneously, enhancing the Young's modulus and the strain point, and lowering the viscosity at high temperature. Further, $ZrO_2$ has an effect of enhancing the viscosity around the liquid phase viscosity. Therefore, by inclusion of a given amount of $ZrO_2$, the ion exchange performance and the liquid phase viscosity can be improved simultaneously. However, if the content of $ZrO_2$ is too large, the denitrification resistance remarkably deteriorates in some cases. Thus, the content of $ZrO_2$ is preferably 0 to 10%, 0.001 to 10%, 0.1 to 9%, 0.5 to 7%, 0.8 to 5%, 1 to 5%, or 2.5 to 5%.

$B_2O_3$ has an effect of lowering the liquid phase temperature, viscosity at high temperature, and density, and has an effect of improving the ion exchange performance, in particular, the compression stress value. However, when the content of $B_2O_3$ is too large, there are possibilities that weathering occurs on the surface by ion exchange, the water resistance deteriorates, and the liquid phase viscosity lowers. Further, the stress depth tends to lower. Therefore, the content of $B_2O_3$ is preferably 0 to 6%, 0 to 3%, 0 to 1%, 0 to 0.5%, particularly preferably 0 to 0.1%.

$TiO_2$ is a component having an effect of improving the ion exchange performance. Further, it has an effect of lowering the viscosity at high temperature. However, when the content of $TiO_2$ becomes too large, the glass is colored, the denitrification property deteriorates, and the density becomes high. Particularly in the case of using the glass as a cover glass for a display, if the content of $TiO_2$ becomes large, the transmittance is liable to change when the melting atmosphere or raw materials are altered. Therefore, in a process of adhering a tempered glass substrate to a device by utilizing light such as an ultraviolet cured resin, ultraviolet irradiation conditions are liable to vary and stable production becomes difficult. Therefore, the content of $TiO_2$ is preferably 10% or less, 8% or less, 6% or less, 5% or less, 4% or less, 2% or less, 0.7% or less, 0.5% or less, 0.1% or less, particularly preferably 0.01% or less.

$P_2O_5$ is a component which enhances the ion exchange performance, and in particular, shows a high effect of increasing a stress thickness. However, when the content of $P_2O_5$ becomes large, the glass manifests phase separation, and the water resistance and the devitrification resistance are liable to lower. Thus, the content of $P_2O_5$ is preferably 5% or less, 4% or less, 3% or less, particularly preferably 2% or less.

As the fining agent, one or more materials selected from the group consisting of $As_2O_3$, $Sb_2O_3$, $CeO_2$, F, $SO_3$, and Cl may be contained in an amount of 0.001 to 3%. It is preferred to refrain as much as possible from the use of $As_2O_3$ and $Sb_2O_3$, in terms of consideration to environments, and the content of each of the components is desirably limited to less than 0.1%, further less than 0.01%. In addition, $CeO_2$ is a component lowering the transmittance, and hence the content is desirably limited to less than 0.1%, further less than 0.01%. In addition, F may lower the viscosity at low temperature, thereby inducing decrease in compression stress value. Thus, the content thereof is preferably limited to less than 0.1%, particularly preferably less than 0.01%. Therefore, $SO_3$ and Cl are preferred fining agents, and it is preferred that one of or both of $SO_3$ and Cl be added in an amount of 0.001 to 3%, 0.001 to 1%, 0.01 to 0.5%, more preferably 0.05 to 0.4%.

Rare earth oxides such as $Nb_2O_5$ and $La_2O_3$ are components enhancing the Young's modulus. However, the cost of the raw material itself is high, and when the rare earth oxides are contained in a large amount, the devitrification resistance deteriorates. Therefore, the content thereof is preferably 3% or less, 2% or less, 1% or less, 0.5% or less, particularly preferably 0.1% or less.

Transition metal elements causing intense coloration of a glass, such as Co and Ni, may lower the transmittance of the tempered glass substrate. In particular, in the case of using transition metal elements in a touch panel display application, when the content thereof is large, the visibility of a tough panel display is deteriorated. Specifically, it is desirable that the use amount of raw materials or cullet be adjusted so that the content thereof is 0.5% or less or 0.1% or less, and particularly 0.05% or less.

The compression stress value of the compression stress layer of the tempered glass substrate according to this embodiment is preferably 300 MPa or more, 400 MPa or more, 500 MPa or more, particularly preferably 600 MPa or more. The larger the compression stress value is, the greater the mechanical strength of the tempered glass substrate is. On the other hand, when extremely large compression stress is formed on the surface, there is a possibility that micro cracks are generated on the surface, which may lead to decrease in the mechanical strength of the tempered glass substrate. In addition, there is a possibility that an internal tensile stress becomes extremely high. Thus, the compression stress value of the compression stress layer is preferably 1,500 MPa or less. Note that the compression stress value tends to increase when the content of $Al_2O_3$, $TiO_2$, $ZrO_2$, MgO, or ZnO in the glass composition is increased, or the content of SrO or BaO in the glass composition is decreased. Alternatively, the compression stress value tends to increase when the time necessary for ion exchange is shortened, or the temperature of an ion exchange solution is decreased.

The stress thickness of the tempered glass substrate is preferably 10 μm or more, 15 μm or more, 20 μm or more, 25 μm or more, 30 μm or more, 35 μm or more, 40 μm or more, 45 μm or more, particularly preferably 50 μm or more. As the stress thickness becomes larger, the tempered glass substrate is more hardly cracked even when the tempered glass substrate has a deep flaw, and a variation in mechanical strength of the tempered glass substrate becomes smaller. On the other hand, as the thickness of the compression stress layer becomes larger, it becomes more difficult to cut the tempered glass substrate. Thus, the stress thickness is preferably 500 μm or less, 200 μm or less, 150 μm or less, 90 μm or less, 70 μm or less, 60 μm or less, particularly preferably 50 μm or less. Note that there is a tendency that the thickness of the compression stress layer is increased by increasing the content of $K_2O$ or $P_2O_5$ in the glass composition or by decreasing the content of SrO or BaO in the glass composition. Further, there is a tendency that the stress thickness is increased by lengthening a time necessary for ion exchange or by increasing the temperature of an ion exchange solution.

The internal tensile stress of the tempered glass substrate is preferably 200 MPa or less, 150 MPa or less, 120 MPa or less, 100 MPa or less, 70 MPa or less, 50 MPa or less, particularly preferably 30 MPa or less. As the internal tensile stress of a tempered glass substrate is larger, the tempered glass substrate may break on its own when a cutting or chamfering process is performed. However, when the internal tensile stress of a tempered glass substrate is extremely small, the compression stress value of its compression stress layer and its stress thickness reduce. Thus, the internal tensile stress is preferably 1 MPa or more, 5 MPa or more, 10 MPa or more, 15 MPa or more.

The tempered glass substrate of this embodiment has a density of preferably 2.6 g/cm$^3$ or less, particularly preferably 2.55 g/cm$^3$ or less. As the density becomes smaller, the weight of the tempered glass can be reduced more. Note that the density is easily reduced by increasing the content of $SiO_2$, $B_2O_3$, or $P_2O_5$ in the glass composition or by reducing the content of an alkali metal oxide, an alkaline earth metal oxide, ZnO, $ZrO_2$, or $TiO_2$ in the glass composition.

The tempered glass substrate of this embodiment has a thermal expansion coefficient of preferably $80\times10^{-7}$ to $120\times10^{-7}$/° C., $85\times10^{-7}$ to $110\times10^{-7}$/° C., $90\times10^{-7}$ to $110\times10^{-7}$/° C., particularly preferably $90\times10^{-7}$ to $105\times10^{-7}$/° C. When the thermal expansion coefficient is controlled within the above-mentioned ranges, it becomes easy to match the thermal expansion coefficient with those of members made of a metal, an organic adhesive, and the like, and the members made of a metal, an organic adhesive, and the like are easily prevented from being peeled off. Herein, the "thermal expansion coefficient" refers to a value obtained through measurement of an average thermal expansion coefficient in the temperature range of 30 to 380° C. with a dilatometer. Note that the thermal expansion coefficient is easily increased by increasing the content of an alkali metal oxide or an alkaline earth metal oxide in the glass composition, and in contrast, the thermal expansion coefficient is easily decreased by reducing the content of the alkali metal oxide or the alkaline earth metal oxide.

The tempered glass substrate of this embodiment has a strain point of preferably 500° C. or more, 520° C. or more, 530° C. or more, particularly preferably 550° C. or more. As the strain point becomes higher, the heat resistance is improved more, and the disappearance of the compression stress layer more hardly occurs when the tempered glass substrate is subjected to thermal treatment. Further, as the strain point becomes higher, stress relaxation more hardly occurs during ion exchange treatment, and thus the compression stress value can be maintained more easily. Further, a high-quality film can be easily formed in patterning to form a touch panel sensor or the like. Note that the strain point is easily increased by increasing the content of an alkaline earth metal oxide, $Al_2O_3$, $ZrO_2$, or $P_2O_5$ in the glass composition or by reducing the content of an alkali metal oxide in the glass composition.

The tempered glass substrate of this embodiment has a temperature at $10^{4.0}$ dPa·s of preferably 1,280° C. or less, 1,230° C. or less, 1,200° C. or less, 1,180° C. or less, particularly preferably 1,160° C. or less. As the temperature at $10^{4.0}$ dPa·s becomes lower, a burden on forming equipment is reduced more, the forming equipment has a longer life, and consequently, the production cost of the tempered glass is more likely to be reduced. Note that the temperature at $10^{4.0}$ dPa·s is easily decreased by increasing the content of an alkali metal oxide, an alkaline earth metal oxide, ZnO, $B_2O_3$, or $TiO_2$ or by reducing the content of $SiO_2$ or $Al_2O_3$.

The tempered glass substrate of this embodiment has a temperature at $10^{2.5}$ dPa·s of preferably 1,620° C. or less, 1,550° C. or less, 1,530° C. or less, 1,500° C. or less, particularly preferably 1,450° C. or less. As the temperature at $10^{2.5}$ dPa·s becomes lower, melting at lower temperature can be carried out, and hence a burden on glass production equipment such as a melting furnace is reduced more, and the bubble quality is easily improved more. That is, as the temperature at $10^{2.5}$ dPa·s becomes lower, the production cost of the tempered glass substrate is more likely to be reduced. Note that the temperature at $10^{2.5}$ dPa·s corresponds to a melting temperature. Further, the temperature at $10^{2.5}$ dPa·s is easily decreased by increasing the content of an alkali metal oxide, an alkaline earth metal oxide, ZnO, $B_2O_3$, or $TiO_2$ in the glass composition or by reducing the content of $SiO_2$ or $Al_2O_3$ in the glass composition.

The tempered glass substrate of this embodiment has a liquidus temperature of preferably 1,200° C. or less, 1,150° C. or less, 1,100° C. or less, 1,050° C. or less, 1,000° C. or less, 950° C. or less, 900° C. or less, particularly preferably 880° C. or less. Note that as the liquidus temperature becomes lower, the devitrification resistance and formability are improved more. Further, the liquidus temperature is easily decreased by increasing the content of $Na_2O$, $K_2O$, or $B_2O_3$ in the glass composition or by reducing the content of $Al_2O_3$, $Li_2O$, MgO, ZnO, $TiO_2$, or $ZrO_2$ in the glass composition.

The tempered glass substrate of this embodiment has a liquidus viscosity of preferably $10^{4.0}$ dPa·s or more, $10^{4.4}$ dPa·s or more, $10^{4.8}$ dPa·s or more, $10^{5.0}$ dPa·s or more, $10^{5.4}$ dPa·s or more, $10^{5.6}$ dPa·s or more, $10^{6.0}$ dPa·s or more, $10^{6.2}$ dPa·s or more, particularly preferably $10^{6.3}$ dPa·s or more. Note that, as the liquidus viscosity becomes higher, the devitrification resistance and formability are improved more. Further, the liquidus viscosity is easily increased by increasing the content of $Na_2O$ or $K_2O$ in the glass composition or by reducing the content of $Al_2O_3$, $Li_2O$, MgO, ZnO, $TiO_2$, or $ZrO_2$ in the glass composition.

The tempered glass substrate of this embodiment has a thickness of preferably 3.0 mm or less, 2.0 mm or less, 1.5 mm or less, 1.3 mm or less, 1.1 mm or less, 1.0 mm or less, 0.8 mm or less, particularly preferably 0.7 mm or less. On the other hand, when the thickness is too small, the warpage level tends to be larger and a desired mechanical strength is hardly provided. Thus, the thickness is preferably 0.1 mm or more, 0.2 mm or more, 0.3 mm or more, particularly preferably 0.4 mm or more.

(2) Glass Substrate to be Tempered

A glass substrate to be tempered according to an embodiment of the present invention is a glass substrate to be tempered formed by a float method, comprising a bottom surface and a top surface, wherein a compression stress value of the bottom surface is larger than a compression stress value of the top surface when the glass substrate to be tempered is immersed in a $KNO_3$ molten salt at 440° C. for 6 hours. In addition, a glass substrate to be tempered according to an embodiment of the present invention is a glass substrate to be tempered formed by a float method, wherein the glass substrate to be tempered has a warpage rate of less than 0.20% (preferably less than 0.15%) when the glass substrate to be tempered is immersed in a $KNO_3$ molten salt at 440° C. for 6 hours. Herein, the term "glass substrate to be tempered" refers to a glass substrate before tempering treatment (untempered glass). The technical features of the glass substrate to be tempered are the same as those of the tempered glass substrate described above. Herein, the description thereof is omitted for convenience sake.

When ion exchange treatment is performed, the temperature of the $KNO_3$ molten salt is preferably 350 to 550° C., particularly preferably 400 to 500° C., and the ion exchange time is preferably 0.1 to 10 hours, 2 to 10 hours, particularly preferably 4 to 8 hours. With this, the compression stress layer can be properly formed easily. Note that, when the glass composition range is controlled as described above, the compression stress value and stress thickness can be increased without using a mixture of a $KNO_3$ molten salt and an $NaNO_3$ molten salt or the like.

(3) Production Method for Glass Substrate to be Tempered and Tempered Glass Substrate The above-mentioned glass substrate to be tempered and tempered glass substrate can be produced, for example, in the following manner.

First, glass raw materials blended so as to have the above-mentioned glass composition are loaded into a continuous melting furnace, melted under heating at 1,500 to 1,600° C., and fined. After that, the molten glass is formed into a sheet-shaped glass or the like by a float method, followed by annealing. Thus, the glass substrate to be tempered can be produced.

Next, the top surface of the glass substrate to be tempered and/or the bottom surface thereof are/is subjected to polishing treatment, if necessary, and then the glass substrate to be tempered is subjected to tempering treatment, thereby manufacturing a tempered glass substrate. Subsequently, the tempered glass substrate is subjected to a cutting process or a chamfering process so as to have a predetermined shape. Note that the cutting process or the chamfering process may be performed before the tempering treatment, but is preferably performed after the tempering treatment in terms of the production efficiency thereof.

The polishing treatment is preferably a step of polishing only the top surface or a step of polishing the top surface and the bottom surface so that a polishing thickness of the top surface is larger than a polishing thickness of the bottom surface. In particular, the polishing thickness of the top surface is preferably 1 to 35 μm, particularly preferably 10 to 30 μm, and the polishing thickness of the bottom surface is preferably 0 to 9 μm, particularly preferably 0 to 5 μm. With this, the compression stress value of the bottom surface easily becomes larger than the compression stress value of the top surface, thus easily reducing the warpage level of the tempered glass substrate. Note that it is recommended to perform the polishing treatment by a well-known method.

Ion exchange treatment is preferably used as the tempering treatment. Conditions for the ion exchange treatment are not particularly limited, and optimum conditions may be selected in view of, for example, the viscosity properties, applications, thickness, and internal tensile stress of glass. The ion exchange treatment can be performed, for example, by immersing the glass substrate to be tempered in a $KNO_3$ molten salt at 400 to 550° C. for 1 to 8 hours. Particularly when the ion exchange of K ions in the $KNO_3$ molten salt with Na components in the glass is performed, it is possible to form efficiently a compression stress layer.

EXAMPLES

Hereinafter, examples of the present invention are described. Note that the following examples are merely illustrative. The present invention is by no means limited to the following examples.

Table 1 shows the glass composition and glass characteristics of each glass to be tempered used in the following experiments.

TABLE 1

|  |  | A | B |
|---|---|---|---|
| Glass composition (wt %) | $SiO_2$ | 61 | 58.5 |
|  | $Al_2O_3$ | 13 | 13 |
|  | MgO | 7 | 2 |
|  | CaO | — | 2 |
|  | $ZrO_2$ | 1 | 4.5 |
|  | $Na_2O$ | 12 | 14.5 |
|  | $K_2O$ | 6 | 5.5 |
| $\rho$ (g/cm³) |  | 2.48 | 2.54 |
| $\alpha$ (×10⁻⁷/° C.) |  | 96 | 102 |
| Ps (° C.) |  | 555 | 533 |
| Ta (° C.) |  | 602 | 576 |
| Ts (° C.) |  | 826 | 793 |
| $10^{4.0}$ dPa·s (° C.) |  | 1,171 | 1,142 |
| $10^{3.0}$ dPa·s (° C.) |  | 1,354 | 1,319 |
| $10^{2.5}$ dPa·s (° C.) |  | 1,477 | 1,431 |
| TL (° C.) |  | 1,107 | 880 |
| $Log_{10}\eta_{TL}$ (dPa·s) |  | 4.5 | 6.4 |

Table 2 shows examples (Sample Nos. 3 to 7) and comparative examples (Sample Nos. 1, 2, and 8 to 10) of the present invention.

TABLE 2

|  |  | Comparative Example | | Example | | | | | Comparative Example | | |
|---|---|---|---|---|---|---|---|---|---|---|---|
|  |  | No. 1 | No. 2 | No. 3 | No. 4 | No. 5 | No. 6 | No. 7 | No. 8 | No. 9 | No. 10 |
| Glass to be tempered | | B | B | B | B | B | B | A | B | B | B |
| Polishing thickness (μm) | Top surface | 0 | 0 | 1 | 15 | 20 | 30 | 1 | 2 | 2 | 2 |
|  | Bottom surface | 0 | 0 | 0 | 2 | 2 | 2 | 0 | 15 | 30 | 50 |
| Ion exchange | Temperature (° C.) | 460 | 450 | 420 | 440 | 440 | 440 | 440 | 440 | 440 | 440 |
|  | Time (hr.) | 4 | 6 | 8 | 6 | 6 | 6 | 6 | 6 | 6 | 6 |
| Compression stress value (MPa) | Top surface | 703 | 651 | 747 | 706 | 670 | 689 | 751 | 732 | 727 | 731 |
|  | Bottom surface | 696 | 646 | 751 | 724 | 695 | 723 | 753 | 692 | 696 | 681 |
|  | ΔCS | −7 | −5 | 4 | 18 | 25 | 34 | 2 | −40 | −31 | −50 |
| Stress thickness (μm) | Top surface | 55 | 62 | 50 | 54 | 54 | 55 | 56 | 56 | 55 | 53 |
|  | Bottom surface | 56 | 61 | 50 | 54 | 53 | 54 | 56 | 56 | 54 | 54 |
| Warpage rate (%) | | 0.22 | 0.21 | 0.19 | 0.03 | −0.14 | −0.16 | 0.20 | 0.30 | 0.34 | 0.41 |

Each of the glass substrates to be tempered A and B mentioned in the tables was produced as described below. First, glass raw materials were blended so that each glass composition shown in the table was achieved, and were melted at 1,580° C. for 8 hours. After that, the resultant molten glass was formed into a glass sheet by a float method, yielding each of the glass substrates to be tempered A and B each having dimensions of 400 mm by 500 mm by 0.7 mm in thickness. Each of the resultant glass sheets to be tempered was evaluated for various characteristics.

The density ρ is a value obtained through measurement by a well-known Archimedes method.

The thermal expansion coefficient α is a value obtained through measurement of an average thermal expansion coefficient in the temperature range of 30 to 380° C. using a dilatometer.

The strain point Ps and the annealing point Ta are values obtained through measurement based on a method of ASTM C336.

The softening point Ts is a value obtained through measurement based on a method of ASTM C338.

The temperatures at the viscosities at high temperature of $10^{4.0}$ dPa·s, $10^{3.0}$ dPa·s, and $10^{2.5}$ dPa·s are values obtained through measurement by a platinum sphere pull up method.

The liquidus temperature TL is a value obtained through measurement of a temperature at which crystals of glass are deposited after glass powder that passes through a standard 30-mesh sieve (sieve opening: 500 μm) and remains on a 50-mesh sieve (sieve opening: 300 μm) is placed in a platinum boat and then kept for 24 hours in a gradient heating furnace.

The liquidus viscosity $\log_{10}\eta_{TL}$ is a value obtained through measurement of a viscosity of glass at the liquidus temperature by a platinum sphere pull up method.

Note that, although the glass composition in the surface layer before tempering treatment is microscopically different from that after the tempering treatment, the glass compositions of the entire glass before and after the tempering treatment are substantially identical.

Next, each of the glass substrates to be tempered described in Table 1 was subjected to each of the polishing treatments described in Table 2 and was then subjected to optical polishing to the minimum extent necessary. Then, ion exchange treatment was performed by immersing each of the glass substrates to be tempered in a $KNO_3$ molten salt under conditions described in Table 2. Thus, tempered glass substrates were yielded. Subsequently, each of the tempered glass substrates was washed after the ion exchange treatment, and then the compression stress value and stress thickness of a compression stress layer were calculated on the basis of the number of interference fringes and each interval between the interference fringes, the interference fringes being observed with a surface stress meter (FSM-6000 manufactured by Toshiba Corporation). In the calculation, the refractive index and optical elastic constant of each of the measured samples were set to 1.52 and 28 [(nm/cm)/MPa], respectively.

The ΔCS value is a value obtained by subtracting the compression stress value of the top surface from the compression stress value of the bottom surface.

The warpage rate is a value obtained by measurement with a laser displacement meter (LK-G35 manufactured by Keyence Corporation), and is an average value (n number=10) calculated on the basis of the expression "maximum displacement/glass width (500 mm)." Note that the cases in which the top surface had a convex shape were represented by "+" and the cases in which the bottom surface had a convex shape were represented by "−."

As evident from Table 2, each of Sample Nos. 3 to 7 had a smaller warpage rate because the bottom surface thereof had a larger compression stress value than that of the top surface thereof. On the other hand, each of Sample Nos. 1, 2, and 8 to 10 had a larger warpage rate because the bottom surface thereof had a smaller compression stress value than that of the top surface thereof.

INDUSTRIAL APPLICABILITY

The tempered glass substrate of the present invention is suitable for a cover glass for a cellular phone, a digital camera, a PDA, or the like, or a substrate for a touch panel display or the like. Further, the tempered glass substrate of the present invention can be expected to find use in applications requiring a high mechanical strength, for example, a window glass, a substrate for a magnetic disk, a substrate for a flat panel display, a cover glass for a solar cell, a cover glass for a solid image pick-up element, and tableware, in addition to the above-mentioned applications.

The invention claimed is:

1. A method of producing a tempered glass substrate, comprising:
    a forming step comprising forming glass into a glass sheet by a float method to obtain a glass substrate to be tempered;
    a polishing step comprising (1) polishing only a top surface of the glass substrate to be tempered, or (2) polishing the top surface and a bottom surface of the glass substrate to be tempered so that a polishing thickness of the top surface is larger than a polishing thickness of the bottom surface; and
    a tempering step comprising applying an ion exchange treatment to the glass substrate to be tempered so that the bottom surface has a larger compression stress value than the top surface to obtain the tempered glass substrate.

2. The method of producing the tempered glass substrate according to claim 1, wherein the tempered glass substrate has a ΔCS value (the compression stress value of the bottom surface−the compression stress value of the top surface) of 5 to 39 MPa.

3. The method of producing the tempered glass substrate according to claim 1, wherein the tempered glass substrate has a warpage rate of less than 0.20%.

4. The method of producing the tempered glass substrate according to claim 1, wherein the tempered glass substrate comprises, as a glass composition in terms of mass %, 40 to 71% of $SiO_2$, 7 to 21% of $Al_2O_3$, 0 to 1% of $Li_2O$, 7 to 20% of $Na_2O$, and 0 to 15% of $K_2O$.

5. The method of producing the tempered glass substrate according to claim 1, wherein the tempered glass substrate has a stress thickness of 10 μm or more.

6. The method of producing the tempered glass substrate according to claim 1, wherein the tempered glass substrate has an internal tensile stress of 200 MPa or less.

7. The method of producing the tempered glass substrate according to claim 1, wherein the tempered glass substrate has a thickness of 1.0 mm or less.

* * * * *